(12) United States Patent
Wu et al.

(10) Patent No.: US 11,339,762 B2
(45) Date of Patent: May 24, 2022

(54) METHOD AND APPARATUS FOR CONTROLLING WIND TURBINE POWER

(71) Applicant: BEIJING GOLDWIND SCIENCE & CREATION WINDPOWER EQUIPMENT CO., LTD., Beijing (CN)

(72) Inventors: Xianyou Wu, Beijing (CN); Shuowen Xiao, Beijing (CN)

(73) Assignee: BEIJING GOLDWIND SCIENCE & CREATION WINDPOWER EQUIPMENT CO., LTD., Beijing (CN)

(*) Notice: Subject to any disclaimer, the term of this patent is extended or adjusted under 35 U.S.C. 154(b) by 277 days.

(21) Appl. No.: 16/349,507

(22) PCT Filed: May 9, 2018

(86) PCT No.: PCT/CN2018/086175
§ 371 (c)(1),
(2) Date: May 13, 2019

(87) PCT Pub. No.: WO2019/128035
PCT Pub. Date: Jul. 4, 2019

(65) Prior Publication Data
US 2020/0263661 A1 Aug. 20, 2020

(30) Foreign Application Priority Data
Dec. 27, 2017 (CN) .......................... 201711450275.5

(51) Int. Cl.
F03D 7/00 (2006.01)
F03D 7/02 (2006.01)
F03D 7/04 (2006.01)

(52) U.S. Cl.
CPC ......... *F03D 7/0224* (2013.01); *F03D 7/0284* (2013.01); *F03D 7/043* (2013.01);
(Continued)

(58) Field of Classification Search
CPC ...... F03D 7/0224; F03D 7/0284; F03D 7/043; F03D 7/048; F03D 7/044;
(Continued)

(56) References Cited

U.S. PATENT DOCUMENTS 10,480,488 B2 * 11/2019 Drossel .................. F03D 7/043
2007/0205602 A1 * 9/2007 Willey .................. F03D 7/0224
290/44

(Continued)

FOREIGN PATENT DOCUMENTS

CN 102480130 A 5/2012
CN 103016266 A 4/2013

(Continued)

OTHER PUBLICATIONS

Zhe Chen, et al; "A Review of the State of the Art of Power Electronics for Wind Turbines", IEEE Transactions on Power Electronics, vol. 24, No. 8, Aug. 2009, 18 pages (Continued)

*Primary Examiner* — Julio G. Gonzalez

(57) ABSTRACT

A method and an apparatus for controlling wind turbine power. The method includes: determining a compensation value for target active power based on a power difference between a net grid-connected power and the target active power; determining a setpoint value of active power based on the target active power and the compensation value; and performing a current-varying control and a pitch control based on the setpoint value of active power.

7 Claims, 3 Drawing Sheets

(52) U.S. Cl.
CPC ...... *F03D 7/048* (2013.01); *F05B 2270/1033* (2013.01); *F05B 2270/328* (2013.01); *F05B 2270/335* (2013.01); *F05B 2270/337* (2013.01)

(58) Field of Classification Search
CPC ........ F05B 2270/1033; F05B 2270/328; F05B 2270/335; F05B 2270/337; H02J 3/46; H02J 3/381; H02J 2300/28; H02J 3/48; Y02E 10/76; Y02E 10/72
See application file for complete search history.

(56) References Cited

U.S. PATENT DOCUMENTS

| | | |
|---|---|---|
| 2011/0074152 A1 | 3/2011 | Yasugi |
| 2017/0298904 A1 | 10/2017 | Nielsen |
| 2017/0335824 A1 | 11/2017 | Gupta et al. |
| 2019/0010926 A1* | 1/2019 | Bode .................. H02J 3/38 |

FOREIGN PATENT DOCUMENTS

| | | |
|---|---|---|
| CN | 103216383 A | 7/2013 |
| CN | 104632524 A | 5/2015 |
| CN | 105119324 A | 12/2015 |
| CN | 107078511 A | 8/2017 |
| CN | 107346893 A | 11/2017 |
| EP | 2434147 A1 | 3/2012 |
| WO | 2014/202077 A1 | 12/2014 |
| WO | 2016/070882 A1 | 5/2016 |

OTHER PUBLICATIONS

Anca D. Hansen et al; "Dynamic wind turbine models in power system simulation tool DlgSILENT", Dec. 1, 2003, Denmark. Forskningscenteer Risoe. pp. 1-82; XP008095424
B.R. Karthikeya, et al; "Overview of Wind Park Control Strategies", IEEE Transactions on Sustainable Energy, vol. 5, No. 2, Apr. 2014, 8 pages.
Paul Sorensen, et al.; "Wind farm models and control strategies", (Riso-R-1464, Denmark, Aug. 1, 2005, pp. 1-63, XP055262131, https://pdfs.semanticscholar.org/e29a/3f9a6d313b6268f2ed9d98479d34b46b0360.pdf.
G. Tapia, et al; "Wind generation optimisation algorithm for a double fed induction generator", IEE proceedings: Generation, Transmission and Distribution, Institution of Electrical Engineers, GB, vol. 152, No. 2, Nov. 29, 2004, pp. 253-263, XP006023722.
The First Chinese Office Action dated Oct. 30, 2019; Appln. No. 201711450275.5.
Extended European Search Report dated Nov. 7, 2019; Appln. No. 18877290.9.
International Search Report dated Jul. 31, 2018; PCT/CN2018/086175.

* cited by examiner

METHOD AND APPARATUS FOR CONTROLLING WIND TURBINE POWER

This application is the national phase of International Application No. PCT/CN2018/086175, titled "METHOD AND APPARATUS FOR CONTROLLING WIND TURBINE POWER", filed on May 09, 2018, which claims the priority to Chinese Patent Application No. 201711450275.5, titled "METHOD AND APPARATUS FOR CONTROLLING WIND TURBINE POWER", filed on Dec. 27, 2017 with the China National Intellectual Property Agency (CNIPA), which is incorporated herein by reference in its entireties.

FIELD

The present disclosure relates to the technical field of control, electrical circuit, and wind power generation, and in particular, to a method and an apparatus for controlling wind turbine power.

BACKGROUND

A dynamic process of wind power generation is converting kinetic energy of the wind into mechanical energy, and then converting the mechanical energy into electric energy. The wind power generation mainly uses the wind power to drive windmill blades to rotate, and then increases a speed of rotation via a speed increaser to make a generator generate electricity. Net grid-connected power of a wind turbine is active power outputted from the wind turbine to a low-voltage side of a box-type transformer. It removes mechanical losses, generator losses, converter losses, internal line losses of wind power, and unit self-consumed power of the wind turbine during wind power generation. Generally, target active power serves as an input of a wind turbine controller. Thereby, the wind turbine controller outputs a current-varying torque setpoint and a pitch angle setpoint, based on the target active power. Thus, the wind turbine can generate power according to the foregoing requirements. Due to an inadequate design of wind turbines at early stages, a deviation of position of a connection with the self-consumed power of the wind turbine, and a difference in design of the converter, measured active power outputted by the wind turbine may not be the net grid-connected power. In addition, there are many reasons for the deviation between the inputted target active power and the net grid-connected power of the wind turbine controller. For example, a loss of a full power converter is related to an ambient temperature. Even if there is the same reason for the deviation between the active power and the net grid-connected power, magnitude of the deviation is different in different situations. For example, loss coefficients from different seasons are inconsistent, and unit losses are also different. Thus, in a case that the active power is used as the input of the wind turbine controller, it requires multiplying the active power by a loss coefficient, thereby increasing or decreasing the current-varying torque setpoint and the pitch angle setpoint outputted by the wind turbine controller, so as to ensure that the net grid-connected power is equal to the target active power.

Generally, the loss coefficient is obtained by measurement, and needs to be set according to parameters that can cover all working conditions. The method described above results in a long period of loss coefficient measurement, and a complete loss coefficient needs data of at least full working conditions which include climate. Also, the parameters may not cover all working conditions. Since all wind farms have different conditions, it is not practical to measure the loss coefficient of each wind farm separately. Further, there may be influencing factors that are currently unknown. Adjusting the wind turbine parameters (especially the current-varying parameter) would have a large impact on the loss coefficient, and parameter optimization is necessary in most cases.

SUMMARY

The object of the present disclosure is to address at least one of the above technical issues, and in particular, address a deviation between target active power and a net grid-connected power inputted into a wind turbine controller due to various reasons, and address issues such as a long period of loss coefficient measurement and complex working conditions that influence parameters.

According to an aspect of the present disclosure, a method for controlling wind turbine power is provided, including: determining a compensation value for target active power based on a power difference between a net grid-connected power and the target active power; determining a setpoint value of active power based on the target active power and the compensation value; and performing a current-varying control and a pitch control based on the setpoint value of active power.

According to another aspect of the present disclosure, a device for controlling wind turbine power is provided, including: a first compensation value determining module, configured to determine a compensation value for target active power based on a power difference between a net grid-connected power and the target active power; an active power setpoint value determining module, configured to determine a setpoint value of active power based on the target active power and the compensation value; and a current-varying and pitch control module, configured to perform a current-varying control and a pitch control based on the setpoint value of active power.

According to yet another aspect of the present disclosure, a computer readable storage medium is provided, where the storage medium stores a computer program, and the computer program when executed by a processor implements steps of the method for controlling wind turbine power according to any one of the above technical solutions.

According to still another aspect of the present disclosure, a computer device is provided, including a memory, a processor, and a computer program stored in the memory and operable on the processor, where the computer program when executed by a processor implements steps of the method for controlling wind turbine power according to any one of the above technical solutions.

Additional aspects and advantages of the present disclosure are hereinafter partially set forth in the following description, which are apparent from the following description or appreciated from practice of the present disclosure.

BRIEF DESCRIPTION OF DRAWINGS

The above-described and/or additional aspects and advantages of the present disclosure are apparent and readily understood from following description of embodiments in conjunction with the drawings.

DETAILED DESCRIPTION

Figure 1:
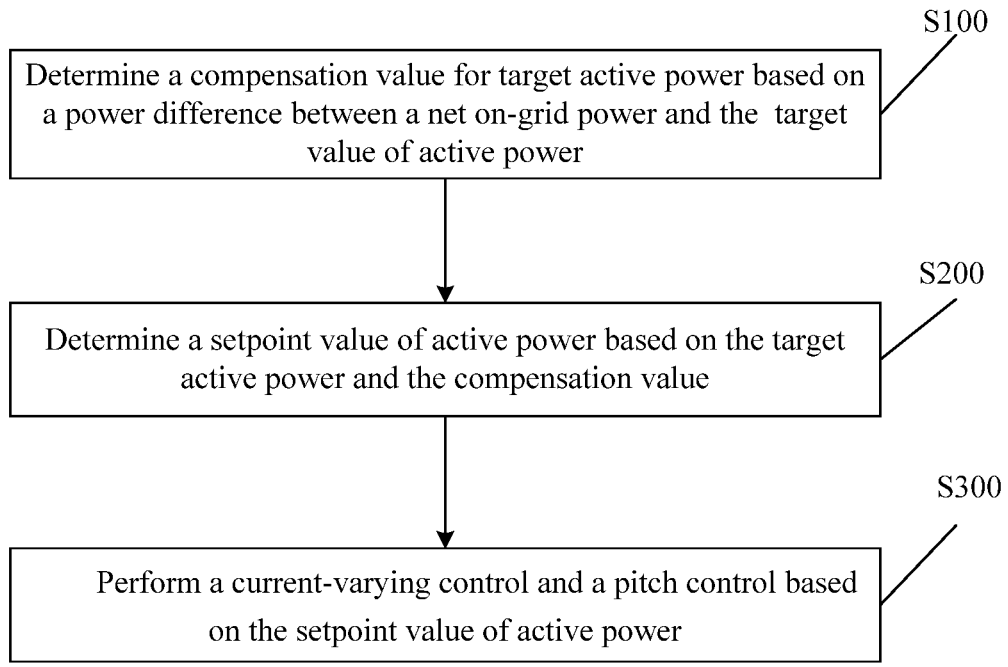
FIG. 1 is a flow chart of a method for controlling wind turbine power according to a typical embodiment of the present disclosure.

The embodiments of the present disclosure are hereinafter described in detail. The examples of the embodiments are illustrated in the drawings, where the same or similar reference numerals refer to same or similar elements or elements having same or similar functions. The embodiments described hereinafter with reference to the drawings are intended to be illustrative, instead of being construed as limitations of the present disclosure.

Those skilled in the art can understand that unless specifically stated, the singular form of "a/an", "one", "the" and "such" used herein may also include the plural form. It should be further understood that the term "include" used in the specification of the present disclosure refers to the presence of the features, integers, steps, operations, elements and/or components, and does not exclude the presence or addition of one or more other features, integers, steps, operations, elements, components and/or groups thereof. It should be understood that, in case of an element being "connected" or "coupled" to another element, it can be directly connected or coupled to the another element, or there may be an intermediate element. Moreover, the "connected" or "coupled" used herein may include a wireless connection or a wireless coupling. The term "and/or" used herein includes all units, any unit, and all combinations, of one or more associated items that are listed.

Those skilled in the art can understand that all terms (including technical and scientific terms) used herein, unless defined otherwise, have the same meaning as commonly understood by those skilled in the art to which this disclosure belongs. It should also be understood that terms, such as those defined in a general dictionary, should be understood to have a meaning consistent with the meaning in the context of the conventional art, and are not interpreted as an idealized or overly formal meaning unless specifically defined herein.

A method for controlling wind turbine power is provided according to the present disclosure. As shown in FIG. 1, the method includes steps S100, S200, and S300.

In S100, a compensation value for the target active power is determined based on a power difference between a net grid-connected power and target active power.

Figure 3:
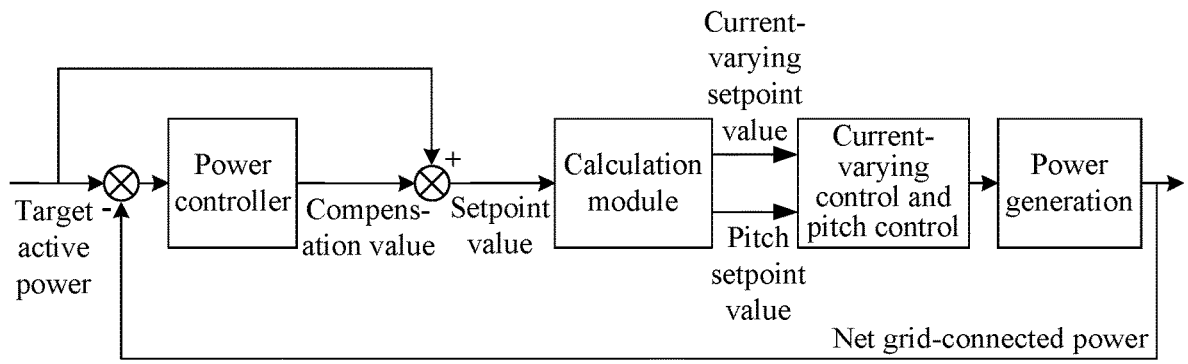
FIG. 3 is a specific process of the method for controlling wind turbine power according to a typical embodiment of the present disclosure.

In an embodiment of the present disclosure, a net grid-connected power detection device is added to dynamically detect the net grid-connected power in real time, receive the target active power in real time, and output the power difference between the net grid-connected power and the target active power to determine the compensation value, as shown in FIG. 3. In an embodiment of the present disclosure, the net grid-connected power of a wind power generation apparatus is detected, and the target active power set by a user is received. A difference between the target active power and the net grid-connected power is determined based on the two according to a preset power calculation rule. The difference is the power difference. Thereby, a deviation between the target active power and the net grid-connected power is determined, to facilitate subsequently determining the compensation value of active power based on the power difference. Further, a calculation rule for correcting the difference between the target active power and the net grid-connected power is provided. According to the rule, the compensation value for the target active power is more accurate, and a fluctuation of the net grid-connected power is avoided, which ensures stability of operation of the entire system. After receiving the power difference, for example, outputted by a power calculation module, the power difference is converted into the compensation value according to the calculation rule. An error of a case that the power difference directly serves as the compensation value for the target active power is decreased. Thereby, the difference between a power setting value and the net grid-connected power can be as small as possible, which ensures that the wind power generation apparatus can operate with full capacity.

In an embodiment of the present disclosure, an installation position of the net grid-connected power detection device may be not in circuits from an output of the wind power generation apparatus to a low-voltage side of a box-type transformer, and hence detected grid-connected power is not the net grid-connected power. In a case that the grid-connected power has a deviation, which is not large and stable, from the net grid-connected power, the subsequent method for controlling wind turbine power according to an embodiment of the present disclosure can also be used to determine the power difference and a calculation process subsequent to the power difference. For example, the installation position of the net grid-connected power detection device is not in the circuits from the output of the wind turbine generation device to the low-voltage side of the box-type transformer, and the deviation between the net grid-connected power and the target active power results from self-consumed power of the wind turbine. In such case, since a fluctuation range of the self-consumed power is not large, the net grid-connected power may be acquired by subtracting a maximum value of the self-consumed power from the currently detected active power. Thereby, a cost of technical modifications and device additions is avoided.

In S200, a setpoint value of active power is determined based on the target active power and the compensation value.

Referring to FIG. 3, based on the target active power set by the user, the foregoing compensation value is combined on the basis of the target active power, to acquire the corrected setpoint value of active power inputted into the wind power generation apparatus. Thereby, it is ensured that the net grid-connected power outputted by the wind power generation apparatus and the target active power inputted into the wind power generation apparatus can be consistent. It is ensured that the power setting value is accurate, and operation of the wind power generation apparatus is stable and reasonable.

In S300, a current-varying control and a pitch control are performed based on the setpoint value of active power.

Reference is made to FIG. 3. After obtaining the setpoint value of active power in the foregoing process, a current-varying setpoint value and a pitch setpoint value are obtained via a calculation module in the wind power generation apparatus based on the setpoint value of active power. The current-varying control and the pitch control are performed on the wind turbine based on the current-varying setpoint and the pitch setpoint. Thereby, the wind power generation apparatus can acquire energy to generate power based on the current-varying setpoint and the pitch setpoint, and convert wind energy into electric energy.

Further, that the compensation value for the target active power is determined based on the power difference between the net grid-connected power and the target active power specifically includes a following step.

In a case that a current pitch angle of the wind turbine is greater than a minimum pitch angle of the wind turbine and the wind turbine is at a power-generating state, the power difference between the net grid-connected power and the target active power is inputted into a proportional-integral controller to obtain the compensation value for the target active power.

Figure 4:
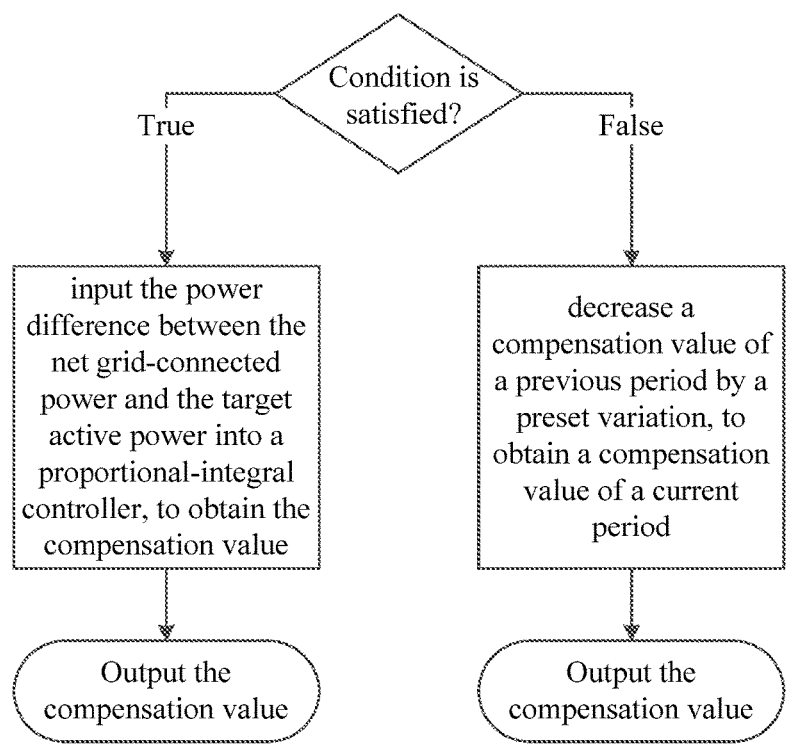
FIG. 4 is a process for determining a compensation value in the method for controlling wind turbine power according to a typical embodiment of the present disclosure.

Since a determination condition is set, in an embodiment of the present disclosure, it is mainly determined whether the current pitch angle of the wind turbine is greater than a minimum pitch angle threshold of the system, and the current power-generating state of the wind turbine. Specifically, as shown in FIG. 4, in a case that the current pitch angle of the wind turbine is greater than the minimum pitch angle threshold of the system and the wind turbine is at the power-generating state, a result of determination is true. The preset determination condition is satisfied, and it is indicated that the wind power generation apparatus can operate in full capacity at the power setting value. The compensation value is further determined based on the aforementioned power difference between the net grid-connected power and the target active power. Specifically, the power difference is inputted into the proportional-integral controller, and the error of the power difference is reduced by the proportional-integral controller. It is ensured that the net grid-connected power outputted by the wind power generation apparatus and the target active power are consistent, and the entire system can operate stably.

In an embodiment, such process can be realized by any controlling manner of an incremental proportional controller or an incremental proportional-integral controller. Thereby, according to problems appearing in the system and a proportional coefficient of wind field requirement, the system reaction is made sensitive, the speed increment is adjusted, the steady-state error is reduced or eliminated based on reduction, and the control precision and the stability of the system are improved.

The method further includes a following step. In a case that the current pitch angle of the wind turbine is not greater than the minimum pitch angle of the wind turbine or the wind turbine is not in the power-generating state, the compensation value of a previous period is controlled, based on a preset variation for each period, to decrease progressively to zero.

As described above, as shown in FIG. 4, in a case that the current pitch angle of the wind turbine is not greater than the minimum pitch angle threshold of the system or the wind turbine is not at the power-generating state, the result of determination is false. The compensation value of the previous period is controlled to decrease with progressive periods based on the preset variation for each period, until the compensation value reaches zero. In a case that the compensation value is less than the preset variation in the penultimate period, the compensation value is directly decreased to zero in the last period. For example, the compensation value is 50 kW, the result of determination is false, and the preset variation for each period is 1 kW. In such case, the compensation value of 50 kW changes after 50 periods to zero in the last period, and decreases according to an arithmetic progression in each period of such process. Namely, the compensation values in corresponding periods are: 49 kW, 48 kW, 47 kW, . . . , and 0 kW, according to progressive numbers of periods. The power setting values inputted into the wind power generating apparatus are determined based on the compensation values according to the periods. In a case that the compensation value is less than 1 kW in the last period, the compensation value would directly be zero in the last period. In a case that the compensation value is 0.6 kW in a certain period, the compensation value would directly be zero in the next period. Further, the period in the embodiment of the present disclosure is an operating period of a power closed-loop control module. As a specific example, the variation for each period is 1 kW, the operating period of the controller for calculation is 0.02 s, and a changing rate of the compensation value is 50 kW/s. In order to ensure that the wind power generation apparatus can also operate normally in a case that power thereof is limited, the changing rate of the compensation value does not exceed a changing rate of the wind turbine power being limited.

Further, that the power difference between the net grid-connected power and the target active power is inputted into the proportional-integral controller to obtain the compensation value of the target active power includes following steps.

Figure 5:
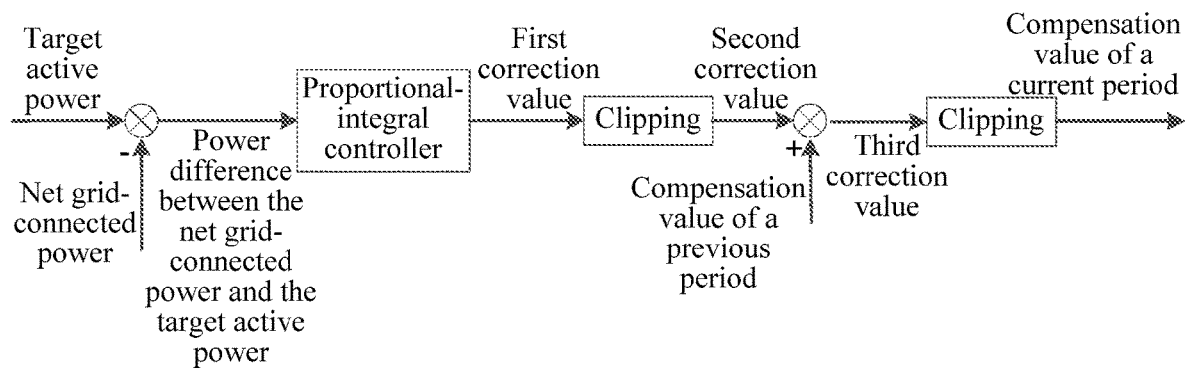
FIG. 5 is a specific process for determining a compensation value in the method for controlling wind turbine power according to a typical embodiment of the present disclosure.

Reference is made to FIG. 5. The power difference between the net grid-connected power and the target active power is inputted into the proportional integral controller to obtain a first correction value through calculation. Amplitude of the first correction value is clipped to obtain a second correction value. The compensation value for the target active power of the previous period and the second correction value are summed to obtain a third correction value. Amplitude of the third correction value is clipped to obtain the compensation value for the target active power of the current period. The compensation value for the target active power of the current period is not greater than a preset proportion of the net grid-connected power.

In an embodiment, the preset proportion is 10%.

Specifically, in combination with the foregoing description, after the power difference is inputted into the proportional-integral controller, the first correction value is obtained through the calculation of the proportional-integral controller. Integral on the first correction value is mainly to limit variation amplitude of the first correction value, so as to perform top and bottom limitation protection on the first correction value. Thereby, it is prevented that an excessive power difference causes an excessive first correction value, which results in the compensation value outputted subsequently being excessive and the compensation value being unreasonable. In the previous period, the clipped compensation value is obtained by clipping amplitude of the third correction value of the previous period. In order to control a total amount of the outputted compensation value, prevent the total amount from exceeding a reasonable range and resulting in abnormal operation of the wind turbine, and make the compensation value of the current period is more accurate, the compensation value of the previous period and the second correction value of the current period are summed to obtain the third compensation value. The amplitude of the third correction value obtained by summing is clipped to obtain the compensation value of the current period. The compensation value in the embodiment of the present disclosure is more accurate by applying the method. Thereby, a loop for detecting the net grid-connected power in power control system of the wind turbine operates at a reasonable state, and the wind turbine in operation is protected from abnormity. In order to ensure that the power control system of the entire wind turbine can operate reasonably, a loop connecting the wind power generation apparatus and, for example, the power calculation module, in the power control system of the wind turbine, is protected to operate under reasonable conditions. In an embodiment, reasonable amplitude may be added or subtracted based on the third correction value. The reasonable amplitude may be an absolute value. Or the reasonable amplitude and an operating state of the wind turbine are stored in a mapping relationship. When clipping the amplitude of the third correction value, the reasonable amplitude corresponding to the operating state of the wind turbine is called, and the compensation value of the current period is obtained based on the reasonable amplitude and the third correction value. Preferably, in amplitude clipping process, the compensation value for the target active power may be controlled no greater than the preset proportion of the net grid-connected power. For example, the final compensation value may not exceed 10% of the net grid-connected power. In an embodiment, the aforementioned process is actually the operating period of the proportional-integral controller.

Figure 2:
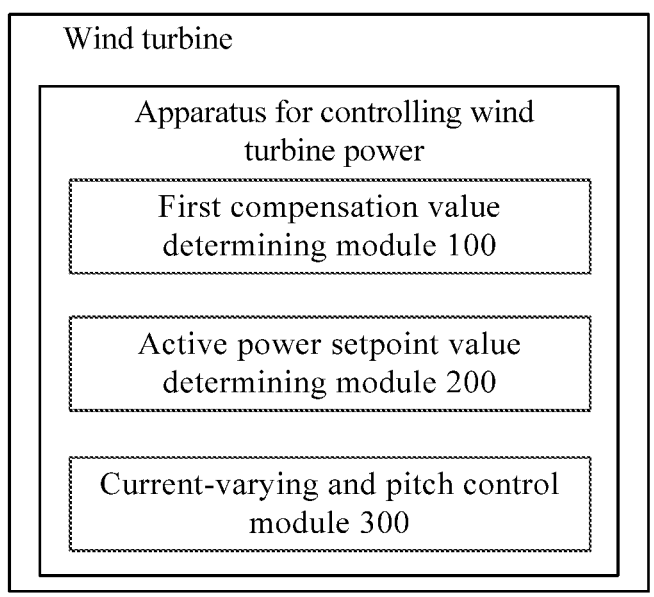
FIG. 2 is a structural diagram of an apparatus for controlling wind turbine power according to a typical embodiment of the present disclosure.

An apparatus for controlling wind turbine power is further provided according to the present disclosure. As shown in FIG. 2, the apparatus includes: a first compensation value determining module 100, an active power setpoint value determining module 200, and a current-varying and pitch control module 300.

The first compensation value determining module 100 may determine a compensation value for target active power according to a power difference between the net grid-connected power and the target active power.

In an embodiment of the present disclosure, a net grid-connected power detection device is added to dynamically detect the net grid-connected power in real time, receive the target active power in real time, and output the power difference between the net grid-connected power and the target active power to determine the compensation value. In an embodiment of the present disclosure, after the net grid-connected power of the wind power generator device is detected and the target active power set by a user is received, a difference between the target active power and the net grid-connected power is determined by the first compensation value determining module 100 based on the two according to a preset power calculation rule. The difference is the power difference. Thereby, a deviation between the target active power and the net grid-connected power is determined, to facilitate subsequently determining the compensation value of active power based on the power difference. Further, a calculation rule for correcting the difference between the target active power and the net grid-connected power is provided. According to the rule, the compensation value for the target active power is more accurate, and a fluctuation of the net grid-connected power is avoided, which ensures stability of operation of the entire system. After receiving the power difference, for example, outputted by a power calculation module, the power difference is converted into the compensation value according to the calculation rule. An error of a case that the power difference directly serves as the compensation value for the target active power is decreased. Thereby, the difference between a power setting value and the net grid-connected power can be as small as possible, which ensures that the wind power generation apparatus can run with full capacity.

The active power setpoint value determining module 200 may determine a setpoint value of active power based on the target active power and the compensation value.

Specifically, the active power setpoint value determining module 200 combines, based on the target active power set by the user, the foregoing compensation value on the basis of the target active power, to acquire the corrected setpoint value of active power inputted into the wind power generation apparatus. Thereby, it is ensured that the net grid-connected power outputted by the wind power generation apparatus and the target active power inputted into the wind power generation apparatus can be consistent. It is ensured that the power setting value is accurate, and operation of the wind power generation apparatus is stable and reasonable.

The current-varying and pitch control module 300 can perform a current-varying control and a pitch control based on the setpoint value of active power.

After obtaining the setpoint value of active power in the foregoing process, a current-varying setpoint value and a pitch setpoint value are obtained by the current-varying and pitch control module 300 in the wind power generation apparatus based on the setpoint value of active power. The current-varying control and the pitch control are performed on the wind turbine based on the current-varying setpoint and the pitch setpoint. Thereby, the wind power generation apparatus can acquire energy to generate power based on the current-varying setpoint and the pitch setpoint, and convert wind energy into electric energy.

Further, the first compensation value determining module 100 may include a proportional-integral controller. In a case that a current pitch angle of the wind turbine is greater than a minimum pitch angle of the wind turbine and the wind turbine is at a power-generating state, the proportional-integral controller calculates the power difference between the inputted net grid-connected power and the inputted target active power, to obtain the compensation value for the target active power.

Since a determination condition is set, in an embodiment of the present disclosure, it is mainly determined whether the current pitch angle of the wind turbine is greater than a minimum pitch angle threshold of the system, and the current power-generating state of the wind turbine. Specifically, in a case that the current pitch angle of the wind turbine is greater than the minimum pitch angle threshold of the system and the wind turbine is at the power-generating state, a result of determination is true. The preset determination condition is satisfied, and it is indicated that the wind power generation apparatus can operate in fully capacity at the power set value. The compensation value is further determined based on the aforementioned power difference between the net grid-connected power and the target active power. Specifically, the power difference is inputted into the proportional-integral controller, and the error of the power difference is reduced by the proportional-integral controller. It is ensured that the net grid-connected power outputted by the wind power generation apparatus and the target active power are consistent, and the entire system can operate stably.

In an embodiment, such process can be realized by any controlling manner of an incremental proportional controller or an incremental proportional-integral controller. Thereby, according to problems appearing in the system and a proportional coefficient of wind field requirement, the system reaction is made sensitive, the speed increment is adjusted, the steady-state error is reduced or eliminated based on reduction, and the control precision and the stability of the system are improved.

Further, the first compensation value determining module 100 is further configured to, in a case that the current pitch angle of the wind turbine is not greater than the minimum pitch angle of the wind turbine or the wind turbine is not at the power-generating state, the compensation value of a previous period is controlled, based on a preset variation for each period, to decrease progressively to zero.

A described above, in a case that the current pitch angle of the wind turbine is not greater than the minimum pitch angle threshold of the system or the wind turbine is not at the power-generating state, the result of determination is false. The compensation value of the previous period is controlled by the first compensation value determining module to decrease with progressive periods based on the preset variation for each period, until the compensation value reaches zero. In a case that the compensation value is less than the preset variation in the penultimate period, the compensation value is directly decreased to zero in the last period. For example, the compensation value is 50 kW, the result of determination is false, and the preset variation for each period is 1 kW. In such case, the compensation value of 50 kW changes after 50 periods to zero in the last period, and decreases according to an arithmetic progression in each period of such process. Namely, the compensation values in corresponding periods are: 49 kW, 48 kW, 47 kW, ..., and 0 kW, according to progressive numbers of periods. The power setting values inputted into the wind power generating apparatus are determined based on the compensation values according to the periods. In a case that the compensation value is less than 1 kW in the penultimate period, the compensation value would directly be zero in the last period. In a case that the compensation value is 0.6 kW in a certain period, the compensation value would directly be zero in the next period. Further, the period in the embodiment of the present disclosure is an operating period of a power closed-loop control module. As a specific example, the variation for each period is 1 kW, the operating period of the controller for calculation is 0.02 s, and a changing rate of the compensation value is 50 kW/s. In order to ensure that the wind power generation apparatus can also operate normally in a case that power thereof is limited, the changing rate of the compensation value does not exceed a changing rate of the wind turbine power being limited.

Further, the first compensation value determining module 100 may include the proportional-integral controller.

The proportional-integral controller may perform calculation on the power difference between the inputted net grid-connected power and the inputted target active power to obtain a first correction value, clip amplitude of the first correction value to obtain a second correction value, sum the compensation value for the target active power of the previous period and the second correction value to obtain a third correction value, and clip amplitude of the third correction value to obtain the compensation value for the target active power of the current period. The compensation value for the target active power of the current period is not greater than a preset proportion of the net grid-connected power. Through this process, variation amplitude of the compensation value finally outputted is not excessive, so that the system can operate stably.

Specifically, in combination with the foregoing description, after the power difference is inputted into the proportional-integral controller, the integrated first correction value is obtained through the calculation of the proportional-integral controller. Integral on the first correction value is mainly to limit variation amplitude of the first correction value, so as to perform top and bottom limitation protection on the first correction value. Thereby, it is prevented that an excessive power difference causes an excessive first correction value, which results in the compensation value outputted subsequently being excessive and the compensation value being unreasonable. In the previous period, the clipped compensation value is obtained by clipping magnitude of the third correction value of the previous period. In order to control a total amount of the outputted compensation value, prevent the total amount from exceeding a reasonable range and resulting in abnormal operation of the wind turbine, and make the compensation value of the current period is more accurate, the compensation value of the previous period and the second correction value of the current period are summed to obtain the third compensation value. The amplitude of the third correction value obtained by summing is clipped to obtain the compensation value of the current period. The compensation value in the embodiment of the present disclosure is made more accurate by applying the method. Thereby, a loop for detecting the net grid-connected power in power control system of the wind turbine operates under a reasonable state, and the wind turbine in operation is protected from abnormity. In order to ensure that the power control system of the entire wind turbine can operate reasonably, a loop connecting the wind power generation apparatus and, for example, the power calculation module, in the power control system of the wind turbine, is protected to operate under reasonable conditions. In an embodiment, reasonable amplitude may be added or subtracted based on the third correction value. The reasonable amplitude may be an absolute value. Or the reasonable amplitude and an operating state of the wind turbine are stored in a mapping relationship. When clipping the amplitude of the third correction value, the reasonable amplitude corresponding to the operating state of the wind turbine is called, and the compensation value of the current period is obtained based on the reasonable amplitude and the third correction value. Preferably, in amplitude clipping process, the compensation value for the target active power may be controlled no greater than the preset proportion of the net grid-connected power. For example, the final compensation value may not exceed 10% of the net grid-connected power. In an embodiment, the aforementioned process is actually the operating period of the proportional-integral controller.

In an embodiment, the apparatus for controlling wind turbine power is arranged in a main controller of the wind turbine.

A computer readable storage medium is further provided according to the present disclosure. The storage medium stores a computer program, and the computer program when executed by a processor implements steps of the method for controlling wind turbine power according to any one of the above technical solutions.

A computer device is further provided according to the present disclosure, including a memory, a processor, and a computer program stored in the memory and operable on the processor. The computer program when executed by a processor implements steps of the method for controlling wind turbine power according to any one of the above technical solutions.

The present disclosure has the following beneficial effects in comparison with conventional technology.

In an exemplary embodiment of the present disclosure, the net grid-connected power outputted by the wind turbine is detected. A value thereof is compared with the target active power. The difference between the target active power and the net grid-connected power is determined, based on which the compensation value for the target active power is determined. The setpoint value of active power is obtained by summing the two values to perform the current-varying control and the pitch control, so that the net grid-connected power can be obtained based on the setpoint value of active power by the wind power generation apparatus. The entire process is automatically achieved without manually testing the loss coefficients of different wind turbines. Since the method and the apparatus according to the present disclosure are applicable to each wind turbine, in a case that there is any source of the deviation between the net grid-connected power and the target active power, it can be ensured that the net grid-connected power is consistent with the target active power, cases that the net grid-connected power is not at full capacity (or over capacity) due to the deviation are reduced, and control accuracy and owner's satisfaction are improved.

In an exemplary embodiment of the present disclosure, in a case that the wind power generation apparatus operates with limited power, the net grid-connected power is consistent with the target active power by adjusting the deviation between the net grid-connected power and the target active power. Thereby, in a case that there are multiple wind turbines running in the wind farm, each wind turbine can quickly respond to the target active power issued by a wind farm power control system (AGC), thus achieving rapid stabilization of power of the wind farm.

In an exemplary embodiment of the present disclosure, it is determined whether the current wind turbine can be at a state that the target active power is full capacity, so as to determine the compensation value for the target active power. In a case that it is determined that the current wind turbine generator cannot operate at the state that the target active power is the full capacity, the compensation value of the previous period is controlled to decrease progressively to zero based on the preset variation for each period. Thereby, the normal operation of the wind turbine is ensured.

In an exemplary embodiment of the present disclosure, in order to adjust the accuracy of the compensation value for the target active power via the proportional-integral controller according to different requirements of the wind farm, the proportional controller can increase a proportional coefficient to make the system reaction sensitive, adjust the speed increment, and reduce the steady-state error. The integral controller can eliminate the steady-state error and improve the control precision. The differential controller can predict a trend of a change of the error, so as to counteract an influence of lagging. An appropriate differential control can reduce an overshoot of adjustment and increase the stability of the system. In addition, the third correction value of the current period is summed with the compensation value of the previous period, and the amplitude of the third correction value is clipped. Thereby, it is prevented that the compensation value of the current period is excessive compared to the compensation value of the previous period and causes unstable operation of the system.

The above description is only part of the embodiments of the present disclosure. It should be noted that those skilled in the art can make some improvements and modifications without deviating from the principles of the present disclosure. Such improvements and modifications should be considered to fall within the protection scope of the present disclosure.

The invention claimed is:

1. A method for controlling wind turbine power, comprising:
  determining a compensation value, based on a power difference between a net grid-connected power and the target active power;
  determining a setpoint value of active power, based on the target active power and the compensation value;
  determining a current-varying setpoint value and a pitch setpoint value based on the setpoint value of active power; and
  performing a current-varying control based on the current-varying setpoint value and performing a pitch control based on the pitch setpoint value,
  wherein the determining a compensation value based on a power difference between a net grid-connected power and the target active power comprises:
  in a case that a current pitch angle of a wind turbine is greater than a minimum pitch angle of the wind turbine and the wind turbine is at a power-generating state,
  inputting the power difference between the net grid-connected power and the target active power into a proportional-integral controller, to obtain the compensation value; and,
  in a case that the current pitch angle of the wind turbine is not greater than the minimum pitch angle of the wind turbine or the wind turbine is not at the power-generating state,
  within a plurality of operating periods of the proportional-integral controller, determining a compensation value of a current period by decreasing a compensation value of a previous period by a preset variation, wherein for each operation period, the compensation value is greater than or equal to zero.

2. The method for controlling wind turbine power according to claim 1, wherein inputting the power difference between the net grid-connected power and the target active power into the proportional-integral controller, to obtain the compensation value, comprises:
  inputting the power difference between the net grid-connected power and the target active power into the proportional-integral controller, to obtain a first correction value through calculation; clipping amplitude of the first correction value, to obtain a second correction value; summing the compensation value of the previous period and the second correction value, to obtain a third correction value; and clipping amplitude of the third correction value, to obtain the compensation value of the current period; wherein the compensation value of the current period is not greater than a preset proportion of the net grid-connected power.

3. The method for controlling wind turbine power according to claim 2, wherein the preset proportion is 10%.

4. A computer readable storage medium, storing a computer program, wherein the computer program when executed by a processor implements steps of the method for controlling wind turbine power according to claim 1.

5. An apparatus for controlling wind turbine power, comprising a proportional-integral controller, a processor and a non-transitory memory storing a computer program, wherein the processor, when executing the computer program, performs the following steps:
  determine a compensation value based on a power difference between a net grid-connected power and the target active power;
  determine a setpoint value of active power based on the target active power and the compensation value;
  determine a current-varying setpoint value and pitch setpoint value based on the setpoint value of active power; and
  perform a current-varying control based on the current-varying setpoint value and perform a pitch control based on the pitch setpoint value, wherein in a case that a current pitch angle of the wind turbine is greater than a minimum pitch angle of the wind turbine and the wind turbine is at a power-generating state, the proportional-integral controller calculates the power difference between the inputted net grid-connected power and the inputted target active power, to obtain the compensation value, in a case that the current pitch angle of the wind turbine is not greater than the minimum pitch angle of the wind turbine or the wind turbine is not at the power-generating state, within a plurality of operating periods of the proportional-integral controller, the processor, when executing the computer program, determine a compensation of a current period by decreasing a compensation value of a previous period by a preset variation, wherein for each operating period, the compensation value is greater than or equal to zero.

6. The apparatus for controlling wind turbine power according to claim 5, wherein the proportional-integral controller: calculates the power difference between the inputted net grid-connected power and the inputted target active power, to obtain a first correction value; clips amplitude of the first correction value, to obtain a second correction value; sums the compensation value of the previous period and the second correction value, to obtain a third correction value; and clips amplitude of the third correction value, to obtain the compensation value of the current period; wherein the compensation value of the current period is not greater than a preset proportion of the net grid-connected power.

7. The apparatus for controlling wind turbine power according to claim 6, being arranged in a main controller of the wind turbine.

* * * * *